(12) United States Patent
Yang et al.

(10) Patent No.: US 11,702,936 B2
(45) Date of Patent: Jul. 18, 2023

(54) GROUTING DEVICE FOR HIGH-COAGULABILITY GROUTING MATERIAL

(71) Applicants: Qingdao University of Technology, Qingdao (CN); Qingdao Metro Line 6 Co., Ltd., Qingdao (CN); CHN Energy Baoshen Railway Group Co., Ltd, Baotou (CN)

(72) Inventors: Zhongnian Yang, Qingdao (CN); Zhengyi Xu, Qingdao (CN); Quanwei Liu, Qingdao (CN); Xianzhang Ling, Qingdao (CN); Cheng Huang, Qingdao (CN); Xiu Liu, Baotou (CN); Linsheng Liu, Qingdao (CN); Xixi Huang, Qingdao (CN)

(*) Notice: Subject to any disclaimer, the term of this patent is extended or adjusted under 35 U.S.C. 154(b) by 0 days.

(21) Appl. No.: 18/014,504

(22) PCT Filed: Jul. 1, 2021

(86) PCT No.: PCT/CN2021/103906
§ 371 (c)(1),
(2) Date: Jan. 5, 2023

(87) PCT Pub. No.: WO2022/007694
PCT Pub. Date: Jan. 13, 2022

(65) Prior Publication Data
US 2023/0184113 A1      Jun. 15, 2023

(30) Foreign Application Priority Data

Jul. 6, 2020 (CN) .......................... 202010639187.5

(51) Int. Cl.
*E21D 20/02* (2006.01)
*F16L 21/08* (2006.01)

(52) U.S. Cl.
CPC ............ *E21D 20/028* (2013.01); *F16L 21/08* (2013.01)

(58) Field of Classification Search
CPC ......... E21D 9/001; E21D 20/028; F16L 21/08
See application file for complete search history.

(56) References Cited

U.S. PATENT DOCUMENTS

2018/0202122 A1* 7/2018 Xu .......................... E02D 5/808

FOREIGN PATENT DOCUMENTS

| CN | 102080552 A | 6/2011 |
|---|---|---|
| CN | 106014454 A | 10/2016 |

(Continued)

*Primary Examiner* — Janine M Kreck
(74) *Attorney, Agent, or Firm* — Bayramoglu Law Offices LLC

(57) ABSTRACT

A grouting device for high-coagulability grouting materials-includes a grouting pipe, a connector and a self-sealing pipe head, wherein one end of the connector is connected with a grouting pump through the grouting pipe, the other end of the connector is connected with the self-sealing pipe head through the grouting pipe, and the grouting pipe is connected with the connector and the self-sealing pipe head in a fixed and sealed mode. The grouting device is easy to install, features reliable connection between the grouting pipe and the connector and the self-sealing pipe head, and can be reused. Because the inner diameter of the connector is consistent with the inner diameter of the grouting pipe, and a slurry outlet on an end cap of the self-sealing pipe head is a circular slurry outlet, pressure loss in the grouting process is effectively reduced, and the grouting effect is good.

7 Claims, 9 Drawing Sheets

(56) References Cited

FOREIGN PATENT DOCUMENTS

| | | |
|---|---|---|
| CN | 209324416 U | 8/2019 |
| CN | 110500126 A | 11/2019 |
| CN | 110630292 A | 12/2019 |
| CN | 111946372 A | 11/2020 |
| JP | 2003028738 A | 1/2003 |
| JP | 2009109394 A | 5/2009 |
| KR | 101924114 B1 | 2/2019 |

\* cited by examiner

GROUTING DEVICE FOR HIGH-COAGULABILITY GROUTING MATERIAL

CROSS REFERENCE TO THE RELATED APPLICATIONS

This application is the national phase entry of International Application No. PCT/CN2021/103906, filed on Jul. 1, 2021, which is based upon and claims priority to Chinese Patent Application No. 202010639187.5, filed on Jul. 6, 2020, the entire contents of which are incorporated herein by reference.

TECHNICAL FIELD

The invention relates to the grouting field, in particular to a grouting device for high-coagulability grouting materials.

BACKGROUND

With the development of grouting technologies, new high-coagulability grouting materials are widely applied to anchor cable construction. However, new materials have the problems of high viscosity, poor flow and high coagulation speed. If not cleaned in time after grouting, new materials tend to block a pipe, thus affecting the grouting effect. It is difficult to ensure the cleaning effect by using a one-piece grouting pipe, so a segmented pipe is recommended, with each segment 4-5 m long. At present, two connection methods are commonly used for a joint position of the segmented pipe, one is muff coupling where iron wires are used for binding, which cannot ensure the effect when a grouting pressure is high; and the other method adopts a commercial connector, which can effectively ensure the connection effect, but installation is time-consuming and labor-intensive, and reducing and damage of the grouting pipe tend to occur. At an end of an anchor cable where a grouting pipe is reserved, in order to ensure that the pipe is clear and prevent impurities from blocking the grouting pipe when installing the anchor cable, a pipe head is generally sealed with adhesive tape which will be pushed away under the grouting pressure during grouting and cannot be reused. In addition, when grouting with a grouting pipe, a slurry surface is spherical, and there is pressure loss in the process of slurry flow, resulting in a limited grouting effect.

SUMMARY

The purpose of the invention is to overcome the above-mentioned defects of the prior art, and propose a grouting device for high-coagulability grouting materials, which is easy to install, features reliable connection between a grouting pipe and a connector and a self-sealing pipe head, and can be reused. Because the inner diameter of the connector is consistent with the inner diameter of the grouting pipe, and a slurry outlet on an end cap of the self-sealing pipe head is a circular slurry outlet, pressure loss in the grouting process is effectively reduced, and the grouting effect is good.

According to the technical solution of the invention, a grouting device for high-coagulability grouting materials includes a grouting pipe, a connector and a self-sealing pipe head, wherein one end of the connector is connected with a grouting pump through the grouting pipe, the other end of the connector is connected with the self-sealing pipe head through the grouting pipe, and the grouting pipe is connected with the connector and the self-sealing pipe head in a fixed and sealed mode;

the connector includes a measuring section, a connecting section, a hold-down bolt and a grouting pipe clamp, and the measuring section is fixedly located in the middle of the connecting section; both the measuring section and the connecting section are provided with inner holes, and the inner holes communicate; a stepped hole is formed in the connecting section and includes a large hole and a small hole, the hole facing the measuring section is the small hole with the same diameter as the inner hole of the measuring section, and the hole facing a free end of the connecting section is the large hole; the grouting pipe clamp reciprocates in the large hole in its axial direction; two axial transverse sliding grooves are symmetrically formed in a pipe wall of the connecting section with the large hole, and the transverse sliding grooves I run through the axial direction of the large hole; one end of an inner wall of the large hole facing the free end of the connecting section is provided with a pressing internal thread, and the pressing internal thread is matched with an external thread of the hold-down bolt; an end of the inner wall of the large hole facing the small hole is provided with a butting section, and the butting section is in contact with the grouting pipe clamp; and the butting section is provided with a circumferential sliding groove;

the hold-down bolt and the grouting pipe clamp are arranged in the large hole of the connecting section from outside to inside in sequence, the hold-down bolt includes a bolt head and a screw fixedly connected with the bolt head, the screw and the bolt head are provided with central holes which communicate with each other, and the grouting pipe clamp is arranged in the central hole of the hold-down bolt; an outer surface of the screw is provided with a pressing external thread, and the pressing external thread is matched with the pressing internal thread in the connecting section; two sliding slits are symmetrically arranged on the screw in its axial direction, and the sliding slits correspond to and vertically communicate with the transverse sliding grooves I; and two transverse sliding grooves II are symmetrically formed in the bolt head correspondingly, and the transverse sliding grooves II are connected with the sliding slits;

the grouting pipe clamp includes an outer wall and an inner pipe, the outer wall is cylindrical and can slide in the central hole of the hold-down bolt in its axial direction, the inner pipe is arranged in the outer wall, and the diameter of the inner pipe is the same as the diameter of the small hole; the inner pipe is fixedly connected with the outer wall, and there is a radial gap between the inner pipe and the outer wall; a pipe wall of the grouting pipe is arranged between the outer wall and the inner pipe; two limit-sliding protrusions are symmetrically arranged on a side of the outer wall facing the small hole, the limit-sliding protrusions are respectively arranged in the transverse sliding groove II and the transverse sliding groove I, and the limit-sliding protrusions slide back and forth in the transverse sliding groove II and the transverse sliding groove I; the limit-sliding protrusions rotate along the circumferential sliding groove; a side of the outer wall facing the free end of the connecting section is provided with several pressing protrusions, and the pressing protrusions are in contact with an end of the hold-down bolt; a locking band is fixed to an end of the outer wall, and two ends of the locking band are connected by a locking bolt;

the self-sealing pipe head includes a grouting pipe socket, an end cap, a connecting limit rod and a connecting spring; the grouting pipe socket is connected with the connector through the grouting pipe, the grouting pipe is fixedly sleeved at one end of the grouting pipe socket, and the other end of the grouting pipe socket is sleeved in the end cap; the grouting pipe socket slides in the end cap, and the grouting pipe socket is connected with the end cap through the connecting spring; one end of the connecting limit rod passes through the grouting pipe socket and is screwed into the end cap, the connecting limit rod is fixedly connected with the end cap, and the other end of the connecting limit rod is provided with a limit mechanism; and an outer surface of the grouting pipe socket is provided with several deformation grooves, and the deformation grooves are provided with fastening bolts.

In the invention, the measuring section is provided with a flow meter and a pressure sensor, and the flow meter and the pressure sensor are connected with the measuring section through sensor joints respectively. The flow meter is used for measuring the flow of the high-coagulability grouting material flowing through the connecting section, and the pressure sensor is used for measuring the pressure of the high-coagulability grouting material flowing through the connecting section. The changes of the grouting pressure and slurry flow at each connecting section are detected through the flow meter and the pressure sensor, so as to provide data support for optimizing grouting parameters.

The outer diameter of the inner pipe is larger than the inner diameter of the grouting pipe, an extrusion sponge is fixed at an end of the outer wall facing the small hole, and a locking band is correspondingly fixed at the other end of the outer wall. The locking and loosening of the locking band are realized by a locking bolt. When the locking bolt is locked, the end of the grouting pipe is locked and fixed on the inner pipe, which prevents the grouting pipe from falling out of the grouting pipe clamp when the grouting pressure is too high.

The grouting pipe socket includes an outer socket wall and an inner socket wall, the inner socket wall is arranged on an inner side of the outer socket wall, and the bottom of the inner socket wall is fixedly connected with the outer socket wall; there is a radial gap between the inner socket wall and the outer socket wall, thus forming a grouting port installation groove, one end of the grouting port installation groove is open and the other end is closed; the pipe wall of the grouting pipe is inserted into the grouting port installation groove from the open end; the outer diameter of the inner socket wall is larger than the inner diameter of the grouting pipe; a reserved limit ring is arranged at a center of the grouting pipe socket, the reserved limit ring is connected with an inner surface of the inner socket wall through several connecting rods arranged at intervals, and the connecting rods divide a gap between the reserved limit ring and the inner socket wall into several slurry flow ports; the connecting limit rod passes through a central hole of the reserved limit ring, and a side of the reserved limit ring facing the grouting pipe is provided with a limit groove; a side face of the reserved limit ring facing the end cap is provided with a connecting spring base, one end of the connecting spring is fixedly connected with the connecting spring base by welding, and the other end of the connecting spring is fixedly connected with the end cap.

The end cap includes a tapered guide cap and a hollow pipe, the tapered guide cap is fixed at the bottom of the hollow pipe, the grouting pipe socket is arranged in the hollow pipe, and the grouting pipe socket slides axially in the hollow pipe; an end of the tapered guide cap is provided with a screw hole, and correspondingly, an end of the connecting limit rod is provided with an external thread; a plug is fixed at the end of the tapered guide cap, and the outer diameter of the plug is the same as the inner diameter of the inner wall of the grouting pipe socket; and a pipe wall of the hollow pipe is provided with several circular slurry outlets.

One end of the connecting limit rod is provided with a tightening thread, the tightening thread is fixedly connected with the screw hole in the end cap through a thread, and the other end of the connecting limit rod is provided with a limit fin; and the limit fin corresponds to the limit groove on the reserved limit ring, and the connecting spring is sleeved outside the connecting limit rod.

To ensure a rotation locking angle, an opening angle of the circumferential sliding groove is 90°, occupying ¼ of a circular section, and the rotation direction of the circumferential sliding groove is opposite to the rotation direction of the pressing internal thread.

The invention has the beneficial effects that:

(1) The arrangement of the grouting pipe clamp which may slide, rotate and stand still in the connecting section realizes the firm connection between the connector and the grouting pipe and ensures the transmission of the grouting pressure.

(2) The arrangement of the grouting pipe socket realizes the firm connection between the self-sealing pipe head and the grouting pipe and ensures the transmission of the grouting pressure.

(3) By making grouting ports on the end cap of the self-sealing pipe head circular grouting ports, and keeping the inner diameter of the port consistent with the inner diameter of the grouting pipe, pressure loss of the slurry in the flowing process is reduced.

(4) The pipe head has a self-sealing function, which may prevent impurities from entering the grouting pipe during the process of releasing the anchor cable; besides, the pipe head is automatically opened during grouting, and automatically closed after grouting, and may be reused and ensure the grouting pressure; and the pipe head is suitable for grouting of high-coagulability grouting materials.

In the figures: 1 measuring section; 2 connecting section; 2-1 transverse sliding groove I; 2-2 pressing internal thread; 2-3 butting section; 2-4 circumferential sliding groove; 3 sensor connector; 4 flow meter; 5 pressure sensor; 6 hold-down bolt; 6-1 pressing external thread; 6-2 transverse sliding groove II; 6-3 sliding slit; 6-4 bolt head; 6-5 screw; 7 grouting pipe clamp; 7-1 outer wall; 7-2 inner pipe; 7-3 extrusion sponge; 7-4 limit-sliding protrusion; 7-5 pressing protrusion; 7-6 locking band; 8. grouting pipe; 9 grouting pipe socket; 9-1 grouting port installation groove; 9-2 deformation groove; 9-3 fastening bolt; 9-4 reserved limit ring; 9-5 slurry flow port; 9-6 limit groove; 9-7 connecting spring base; 10 end cap; 10-1 tapered guide cap; 10-2 hollow pipe; 10-3 circular slurry outlet; 10-4 screw hole; 10-5 plug; 11 connecting limit rod; 11-1 limit fin; 11-2 tightening thread; 12 connecting spring.

DETAILED DESCRIPTION OF THE EMBODIMENTS

In order to make the above objects, features and advantages of the invention better understood, the specific embodiments of the invention will be described in detail below with reference to the accompanying drawings.

In the following description, specific details are set forth in order to fully understand the invention. However, the invention can be implemented in many other ways different from those described here, and those skilled in the art can make similar extension without violating the connotation of the invention. Therefore, the invention is not limited by the specific embodiments disclosed below.

Figure 1:
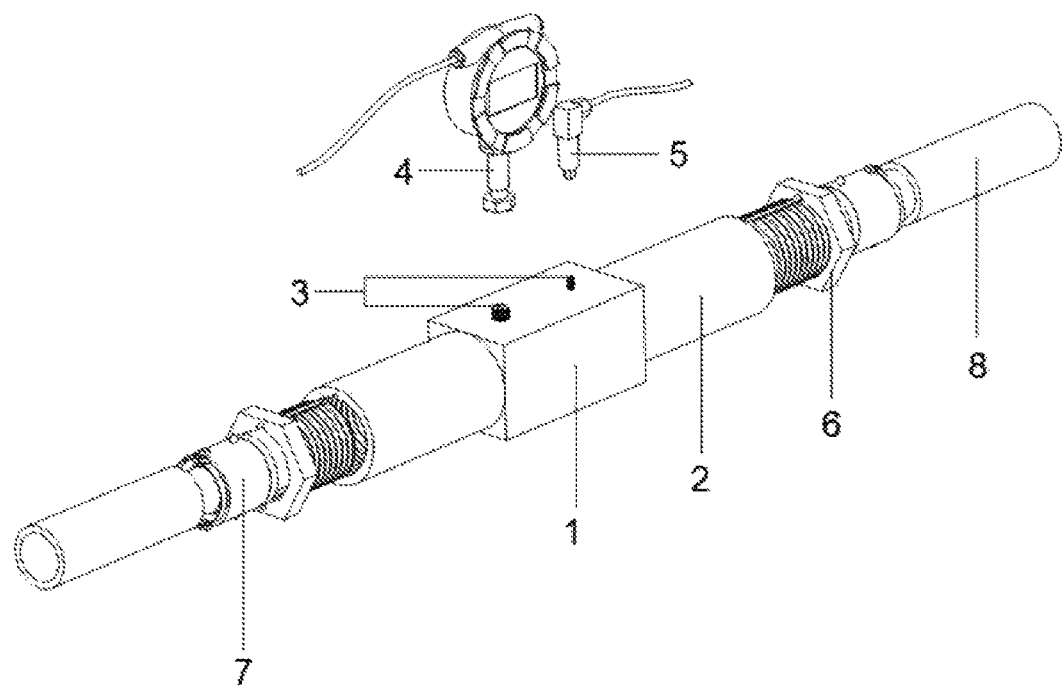
FIG. 1 is a structural diagram when a grouting pipe and a connector are not connected.
Figure 2:
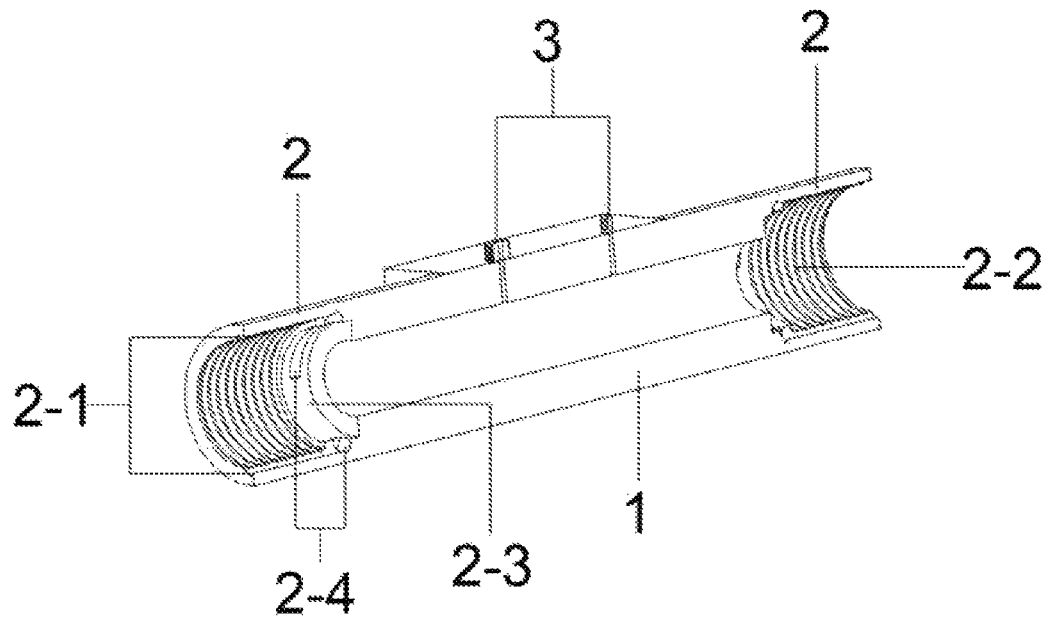
FIG. 2 is a structural diagram of a connecting section of a connector.

As shown in FIG. 1, a grouting device for high-coagulability grouting materials according to the invention includes a grouting pipe 8, a connector and a self-sealing pipe head, wherein one end of the connector is connected with a grouting pump through the grouting pipe 8, and the other end of the connector is connected with the self-sealing pipe head through the grouting pipe. The grouting pipe 8 is connected with the connector and the self-sealing pipe head in a fixed and sealed mode. A high-coagulability grouting material extracted by the grouting pump flows into the connector through the grouting pipe, then flows into the self-sealing pipe head through the grouting pipe, and then is injected into a borehole from the self-sealing pipe head to realize anchor cable construction. Because the grouting device is used for the high-coagulability grouting materials, that is, the grouting material has strong coagulability, in order to facilitate cleaning, the invention adopts a segmented grouting pipe, and in this embodiment, a rigid PVC pipe with a diameter of 32 mm and a length of 3-5 m is used.

The connector includes a measuring section 1, a connecting section 2, a hold-down bolt 6 and a grouting pipe clamp 7. The measuring section 1 is fixedly located in the middle of the connecting section 2, that is, left and right sides of the measuring section 1 are both fixedly connected with the connecting section 2. Both the measuring section 1 and the connecting section 2 are provided with inner holes with the same diameter, and the inner holes communicate to allow the high-coagulability grouting material to pass easily. In this embodiment, the measuring section 1 and the connecting section 2 are fixedly connected by welding. The measuring section 1 is provided with a flow meter 4 and a pressure sensor 5, and the flow meter 4 and the pressure sensor 5 are connected with the measuring section 1 through sensor joints 3 respectively, wherein the flow meter 4 is used for measuring the flow of the high-coagulability grouting material flowing through the connecting section 2, and the pressure sensor 5 is used for measuring the pressure of the high-coagulability grouting material flowing through the connecting section 2. The changes of the grouting pressure and slurry flow at each connecting section are detected through the flow meter 4 and the pressure sensor 5, so as to provide data support for optimizing grouting parameters.

A stepped hole is formed in the connecting section 2 and includes a large hole and a small hole, wherein the hole facing the measuring section 1 is the small hole with the same diameter as the inner hole of the measuring section 1, and the hole facing a free end of the connecting section 2 is the large hole, that is, the diameter of the hole facing the measuring section 1 is smaller than that of the hole facing the free end of the connecting section 2. The grouting pipe clamp 7 is capable of reciprocating in the large hole in its axial direction. Two axial transverse sliding grooves I 2-1 are symmetrically formed in a pipe wall of the connecting section 2 with the large hole, and the transverse sliding grooves I 2-1 extend from one end of the large hole to the other end of the large hole and run through the axial direction of the large hole. One end of an inner wall of the large hole facing the free end of the connecting section is provided with a pressing internal thread 2-2, and the pressing internal thread 2-2 is matched with an external thread of the hold-down bolt. An end of the inner wall of the large hole facing the small hole is provided with a butting section 2-3, and the butting section 2-3 is in contact with the grouting pipe clamp 7. The butting section 2-3 is provided with a circumferential sliding groove 2-4. In order to ensure a rotation locking angle, an opening angle of the circumferential sliding groove 2-4 is 90°, occupying ¼ of a circular section, and the rotation direction of the circumferential sliding groove 2-4 is opposite to the rotation direction of the pressing internal thread 2-2, thus realizing the reverse rotation of the grouting pipe clamp 7 in the connecting section 2.

Figure 3:
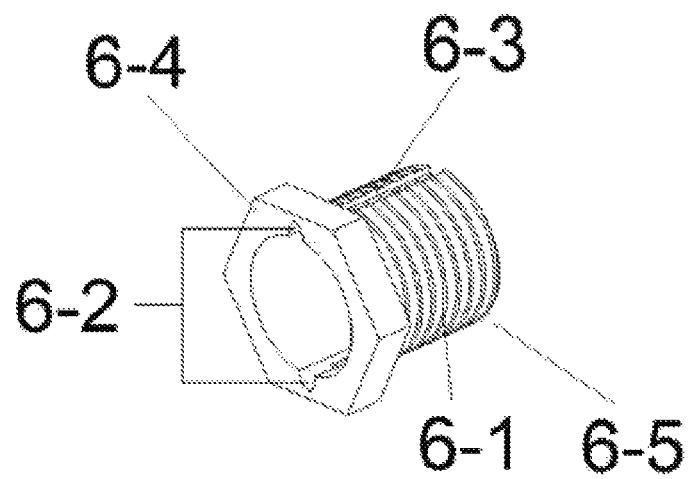
FIG. 3 is a structural diagram of a fastening bolt.

The hold-down bolt 6 and the grouting pipe clamp 7 are arranged in the large hole of the connecting section 2 from outside to inside in sequence. As shown in FIG. 3, the hold-down bolt 6 includes a bolt head 6-4 and a screw 6-5 fixedly connected with the bolt head. The screw 6-5 and the bolt head 6-4 are provided with central holes which communicate with each other, and the grouting pipe clamp 7 is arranged in the central hole of the hold-down bolt 6. An outer surface of the screw 6-5 is provided with a pressing external thread 6-1. The pressing external thread 6-1 is matched with the pressing internal thread 2-2 in the connecting section 2 to tighten the hold-down bolt in the connecting section. Two sliding slits 6-3 are symmetrically arranged on the screw 6-5 in its axial direction, and the sliding slits 6-3 correspond to and vertically communicate with the transverse sliding grooves I 2-1. Two transverse sliding grooves II 6-2 are symmetrically formed in the bolt head 6-4 correspondingly, and the transverse sliding grooves II 6-2 are connected with the sliding slits 6-3 to provide space for axial sliding of the grouting pipe clamp 7.

Figure 4:
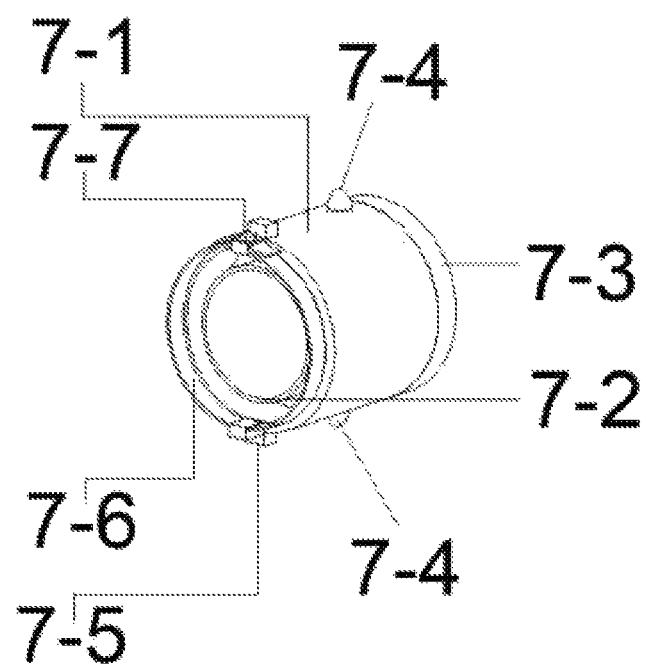
FIG. 4 is a structural diagram of a grouting pipe clamp.

The grouting pipe clamp 7 is arranged in the hold-down bolt 6 and is of a double-layer structure. As shown in FIG. 4, the grouting pipe clamp 7 includes an outer wall 7-1 and an inner pipe 7-2. The outer wall 7-1 is cylindrical and can slide in the central hole of the hold-down bolt 6 in its axial direction. The inner pipe 7-2 is arranged in the outer wall 7-1, and the diameter of the inner pipe 7-2 is the same as the diameter of the small hole, thus ensuring the transmission of the grouting pressure. The inner pipe 7-2 is fixedly connected with the outer wall 7-1. There is a radial gap between the inner pipe 7-2 and the outer wall 7-1. A pipe wall of the grouting pipe 8 is arranged between the outer wall 7-1 and the inner pipe 7-2. The outer diameter of the inner pipe 7-2 is slightly larger than the inner diameter of the grouting pipe. When the grouting pipe is inserted between the outer wall 7-1 and the inner pipe 7-2, the inner pipe 7-2 expands an end of the grouting pipe 8, thus allowing the grouting pipe to be fixedly sleeved on the inner pipe 7-2 easily. An extrusion sponge 7-3 is fixed at an end of the outer wall 7-1 facing the small hole, and a locking band 7-6 is correspondingly fixed at the other end of the outer wall 7-1. The extrusion sponge 7-3 buffers the contact between the grouting pipe clamp 7 and the butting section, and the extrusion sponge 7-3 helps block a gap between the grouting pipe clamp 7 and the butting section to prevent slurry from flowing out. Two ends of the locking band 7-6 are connected by a locking bolt 7-7, and the locking and loosening of the locking band 7-6 are realized by the locking bolt 7-7. When the locking bolt 7-7 is locked, the end of the grouting pipe 8 is locked and fixed on the inner pipe 7-2, which prevents the grouting pipe 8 from falling out of the grouting pipe clamp 7 when the grouting pressure is too high.

Two limit-sliding protrusions 7-4 are symmetrically arranged on a side of the outer wall 7-1 facing the small hole. The limit-sliding protrusions 7-4 are respectively arranged in the transverse sliding groove II 6-2 and the transverse sliding groove I 2-1, and the limit-sliding protrusions 7-4 are capable of sliding back and forth in the transverse sliding groove II 6-2 and the transverse sliding groove I 2-1, thus realizing the axial movement of the grouting pipe clamp 7. When the limit-sliding protrusions 7-4 slide to the circumferential sliding groove 2-4, the grouting pipe clamp 7 is rotated, the limit-sliding protrusions 7-4 rotate into the circumferential sliding groove 2-4, and the limit-sliding protrusions 7-4 are capable of sliding in the circumferential sliding groove 2-4, thereby locking the position of the grouting pipe clamp 7 and preventing the grouting pipe clamp 7 from falling out of the connecting section 2.

Further, the outer wall 7-1 is provided with pressing protrusions 7-5, the pressing protrusions 7-5 are located on a side of each sliding protrusion 7-4 facing the free end of the connecting section, and several pressing protrusions 7-5 are arranged at intervals on an annular outer surface of the outer wall 7-1. In this embodiment, two pressing protrusions 7-5 are symmetrically arranged on the annular outer surface of the outer wall 7-1, and the pressing protrusions 7-5 are in contact with an end of the hold-down bolt 6. The pressing protrusions 7-5 are the main acting points of the hold-down bolt on the grouting pipe clamp. During the rotation locking of the grouting pipe clamp 7 in the connecting section 2, the hold-down bolt 6 makes contact with the pressing protrusions 7-5, and the grouting pipe clamp 7 is pressed by a force exerted by the hold-down bolt 6, so as to bear the grouting pressure.

Figure 10:
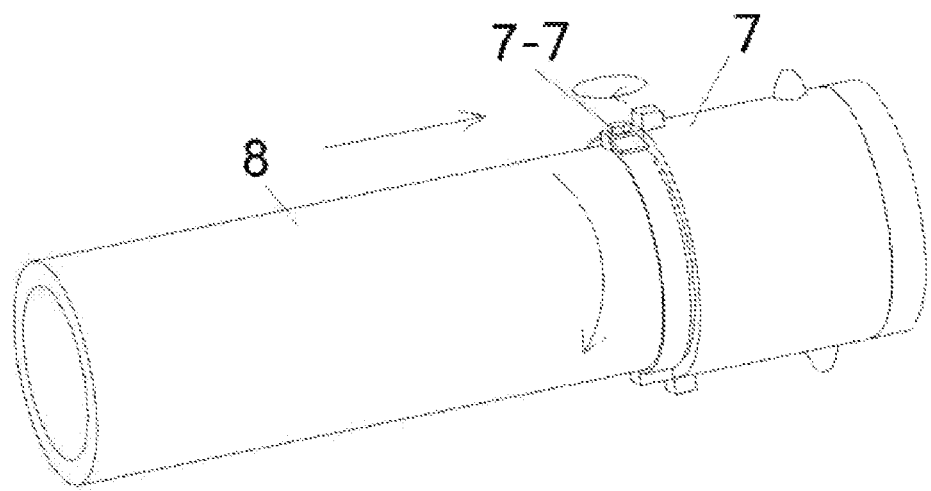
FIG. 10 is a structural diagram when a grouting pipe clamp is connected with a grouting pipe.

To assembly the connector, the grouting pipe clamp 7 needs to be installed first. As shown in FIG. 10, the end of the grouting pipe 8 is heated and softened with hot water, and then sleeved in the gap between the outer wall of 7-1 and the inner pipe of 7-2. Since the outer diameter of the inner pipe of 7-2 is larger than the inner diameter of the grouting pipe, an expanded section is formed after the grouting pipe is sleeved into the inner pipe 7-2. After cooling, the locking bolt 7-7 is adjusted to shrink the locking band 7-6 and press the grouting pipe 8 to prevent the grouting pipe 8 from falling out. In the invention, two ends of the connecting section 2 are both connected with the grouting pipe 8, and the grouting pipe clamp 7 and the grouting pipe 8 are installed at all joints connected with the grouting pipe according to the above steps, thus realizing the repeated use of the grouting pipe clamp 7 and the grouting pipe 8.

Figure 11:
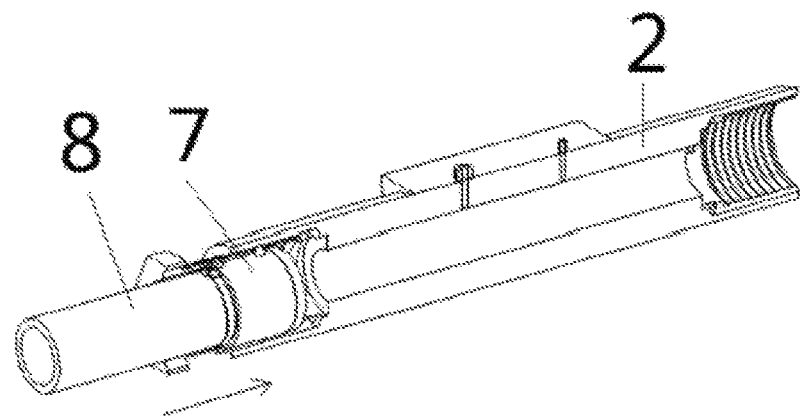
FIG. 11 is a structural diagram showing that a grouting pipe clamp is inserted into a connecting section.
Figure 12:
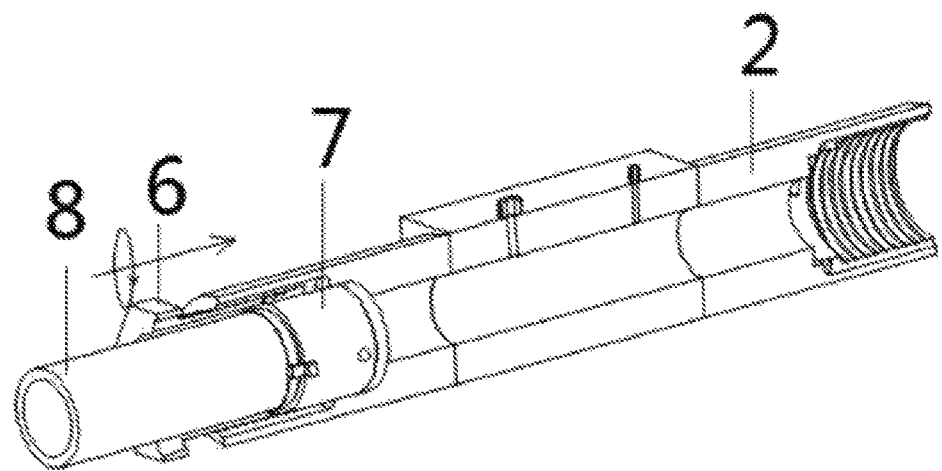
FIG. 12 is a structural diagram of a grouting pipe clamp and a connecting section after a hold-down bolt is tightened.

After installing the grouting pipe clamp 7, the grouting pipe and the connecting section 2 are connected. As shown in FIG. 11, firstly, the hold-down bolt 6 is screwed into the connecting section 2, and the position of the hold-down bolt 6 is adjusted so that the transverse sliding grooves II 6-2 and the sliding slits 6-3 on the hold-down bolt 6 communicate with the transverse sliding grooves I 2-1 on the connecting section 2. The limit-sliding protrusions 7-4 on the grouting pipe clamp 7 are slid into the butting section 2-3 along the transverse sliding grooves II 6-2 and the sliding slits 6-3. As shown in FIG. 12, after reaching a specified position, the grouting pipe 8 is rotated counterclockwise or the connecting section 2 is rotated clockwise, so that the limit-sliding protrusions 7-4 slide into the circumferential sliding groove 2-4, thus locking the grouting pipe 8 and preventing the grouting pipe 8 from falling out. Finally, the hold-down bolt 6 is tightened, so that the end of the hold-down bolt 6 tightly presses a limit protrusion 7-5, making the extrusion sponge 7-3 at the end of the grouting pipe clamp 7 in sealed contact with the connecting section 2. At this point, grouting pipe connection of one side is completed, and the above steps are repeated until both ends of the connecting section are connected with the grouting pipe. Disassembly may be achieved by reversing the above steps.

Figure 13:
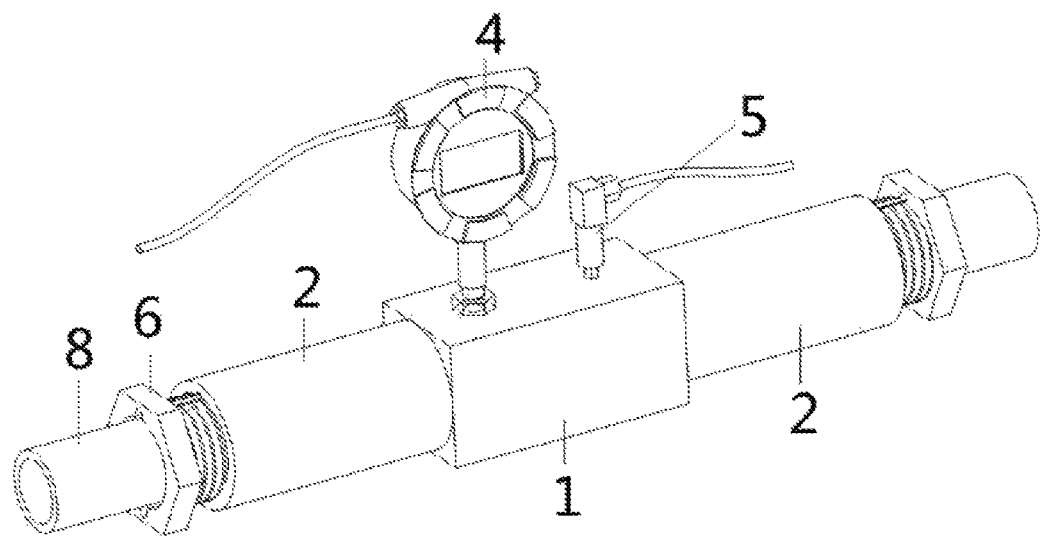
FIG. 13 is a structural diagram when a grouting pipe and a connector are connected.

As shown in FIG. 13, after the grouting pipe 8 is connected with the connecting section 2, the flow meter 4 and the pressure sensor 5 are installed on the sensor joint 3 of the measuring section 1. In actual production, the installation density of instruments may be reduced. It is only necessary to install 3 sensor groups in one grouting pipe, and connection without the sensor joint 3 may also be adopted at the joint.

Figure 5:
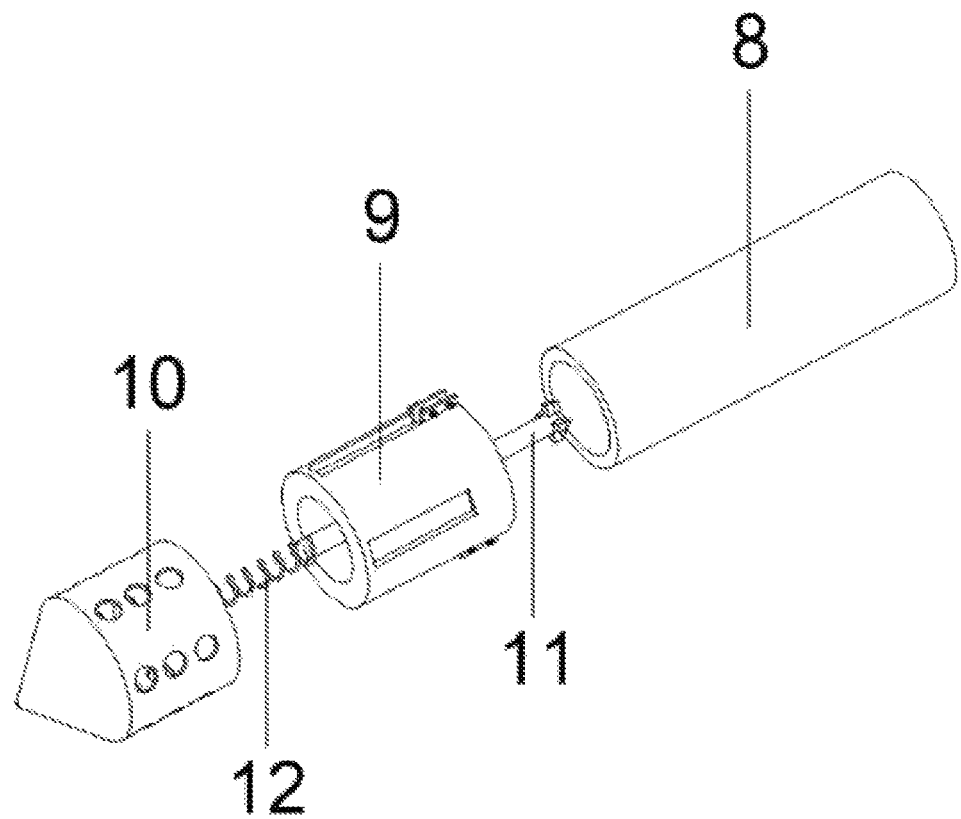
FIG. 5 is an explosive view of a self-sealing pipe head.

As shown in FIG. 5, the self-sealing pipe head includes a grouting pipe socket 9, an end cap 10, a connecting limit rod 11 and a connecting spring 12. The grouting pipe socket 9 is connected with the connector through the grouting pipe 8, the grouting pipe 8 is fixedly sleeved at one end of the grouting pipe socket 9, and the other end of the grouting pipe socket 9 is sleeved in the end cap 10. The grouting pipe socket 9 is connected with the end cap 10 through the connecting spring 12. One end of the connecting limit rod 11 passes through the grouting pipe socket 9 and is screwed into the end cap 10, realizing fixed connection between the connecting limit rod 11 and the end cap 10, and the other end of the connecting limit rod 11 is provided with a limit mechanism to prevent the end cap 10 from falling out. The connecting spring 12 is sleeved outside the connecting limit rod 11.

Figure 6:
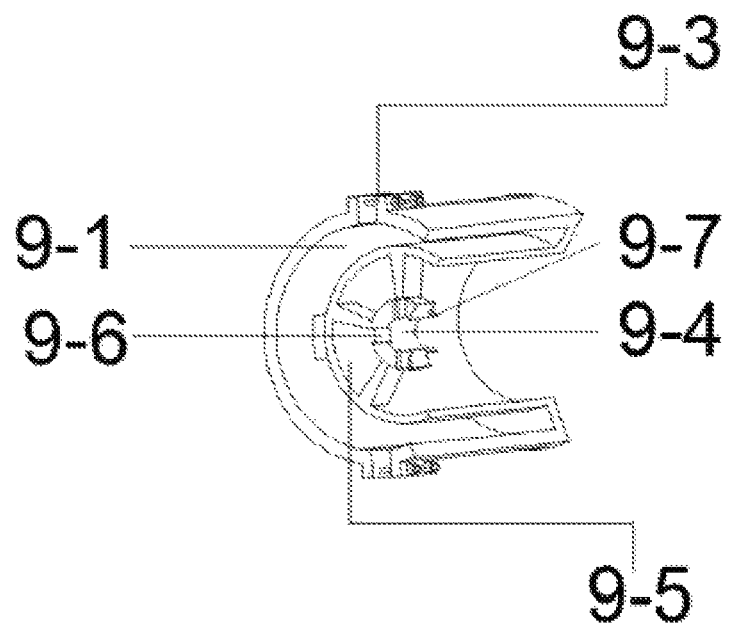
FIG. 6 is a first structural diagram of a grouting pipe socket.

As shown in FIG. 6, the grouting pipe socket 9 includes an outer socket wall and an inner socket wall. The inner socket wall is arranged on an inner side of the outer socket wall. The bottom of the inner socket wall is fixedly connected with the outer socket wall. There is a radial gap between the inner socket wall and the outer socket wall, thus forming a grouting port installation groove 9-1. One end of the grouting port installation groove 9-1 is open and the other end is closed. The pipe wall of the grouting pipe 8 is inserted into the grouting port installation groove 9-1 from the open end. In the invention, the outer diameter of the inner socket wall is larger than the inner diameter of the grouting pipe 8, so when the grouting pipe is inserted into an outer side of the inner socket wall, an expanded section is formed at the end of the grouting pipe 8, allowing the grouting pipe to be fixedly sleeved on the grouting pipe socket 9 easily. The outer socket wall is provided with several deformation grooves 9-2, and the deformation grooves 9-2 are provided with fastening bolts. After the grouting pipe is sleeved into the grouting port installation groove 9-1, the fastening bolts are tightened to reduce the inner diameter of the outer socket wall, so as to press the grouting pipe on the inner socket wall and prevent the grouting pipe from falling out of the grouting pipe socket under a high grouting pressure. In this embodiment, the outer socket wall is provided with four deformation grooves 9-2, two of which are provided with fastening bolts.

A reserved limit ring 9-4 is arranged at a center of the grouting pipe socket 9. The reserved limit ring 9-4 is connected with an inner surface of the inner socket wall through several connecting rods arranged at intervals. The connecting rods divide a gap between the reserved limit ring 9-4 and the inner socket wall into several slurry flow ports 9-5, and the high-coagulability grouting material flows to a space between the grouting pipe socket 9 and the end cap 10 along the slurry flow ports 9-5. The connecting limit rod 11 passes through a central hole of the reserved limit ring 9-4. A side of the reserved limit ring 9-4 facing the grouting pipe is provided with a limit groove 9-6, and the limit groove 9-6 corresponds to the limit mechanism on the limit rod 11 to prevent the limit rod 11 from rotating during grouting. A side face of the reserved limit ring 9-4 facing the end cap 10 is provided with a connecting spring base 9-7, one end of the connecting spring 12 is fixedly connected with the connecting spring base 9-7 by welding, and the other end of the connecting spring 12 is fixedly connected with the end cap 10.

Figure 7:
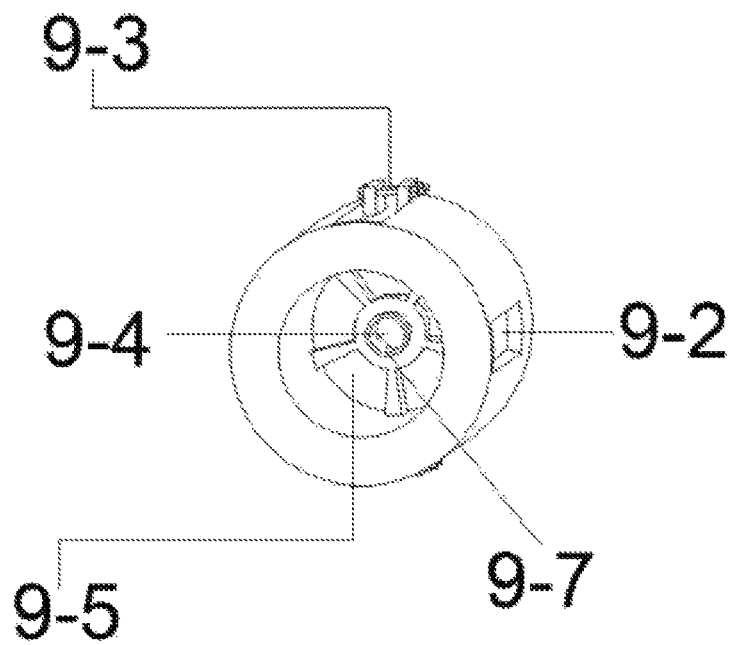
FIG. 7 is a second structural diagram of a grouting pipe socket.

As shown in FIG. 7, the end cap 10 includes a tapered guide cap 10-1 and a hollow pipe 10-2, the tapered guide cap 10-1 is fixed at the bottom of the hollow pipe 10-2, the grouting pipe socket 9 is arranged in the hollow pipe 10-2, and the grouting pipe socket 9 is capable of sliding axially in the hollow pipe 10-2. An end of the tapered guide cap 10-1 is provided with a screw hole 10-4, and correspondingly, an end of the connecting limit rod 11 is provided with an external thread, so that the end cap 10 is fixedly connected with the connecting limit rod 11. Further, a plug 10-5 is fixed at the end of the tapered guide cap 10-1, and the outer diameter of the plug 10-5 is the same as the inner diameter of the inner wall of the grouting pipe socket 9. Under the non-grouted condition, the plug 10-5 blocks an end of the grouting pipe socket 9 to prevent foreign matter from entering. The hollow pipe 10-2 is provided with several circular slurry outlets 10-3, and slurry is discharged through the circular slurry outlets 10-3, thereby realizing grouting. A grouting surface of the circular slurry outlet is cylindrical as a whole, which improves the grouting effect.

Figure 8:
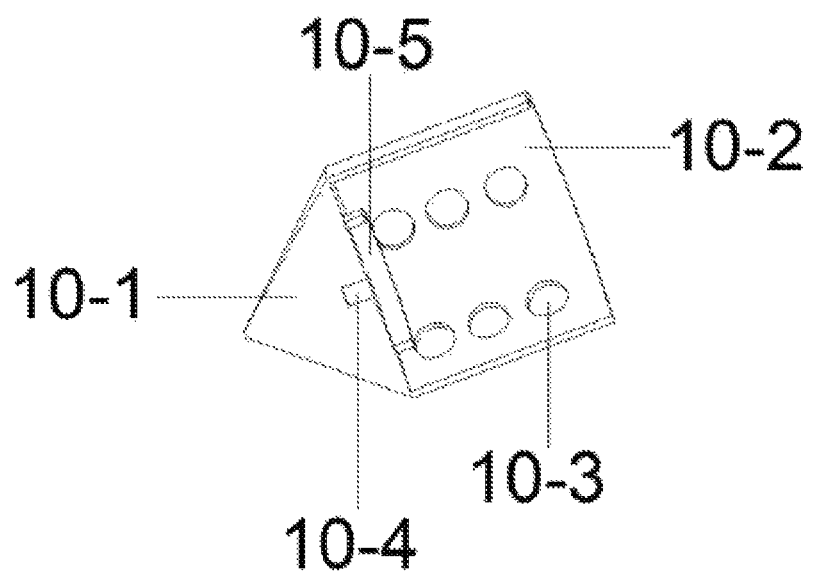
FIG. 8 is a sectional view of an end cap.
Figure 9:
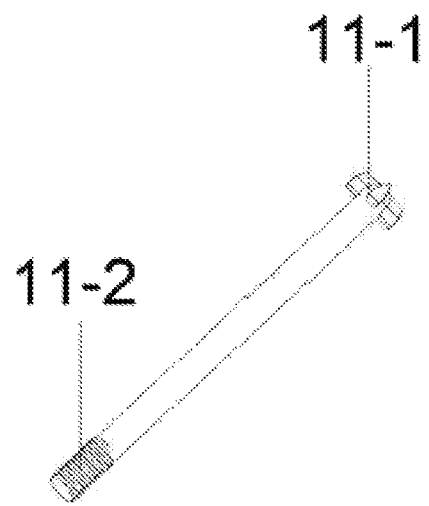
FIG. 9 is a structural diagram of a connecting limit rod.

As shown in FIG. 8, one end of the connecting limit rod 11 is provided with a tightening thread 11-2, and the tightening thread 11-2 is fixedly connected with the screw hole 10-4 in the end cap 10 through a thread. The other end of the connecting limit rod 11 is provided with a limit fin 11-1, and the limit fin 11-1 corresponds to the limit groove 9-6 on the reserved limit ring 9-4.

Figure 14:
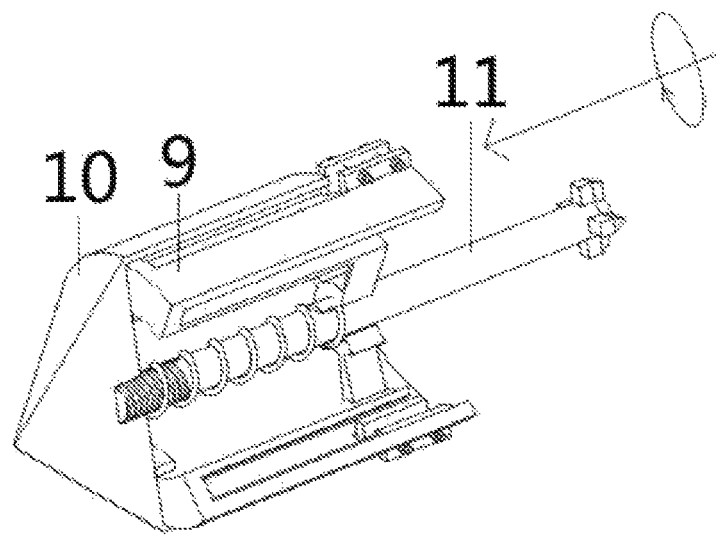
FIG. 14 is a sectional view of a self-sealing pipe head.
Figure 15:
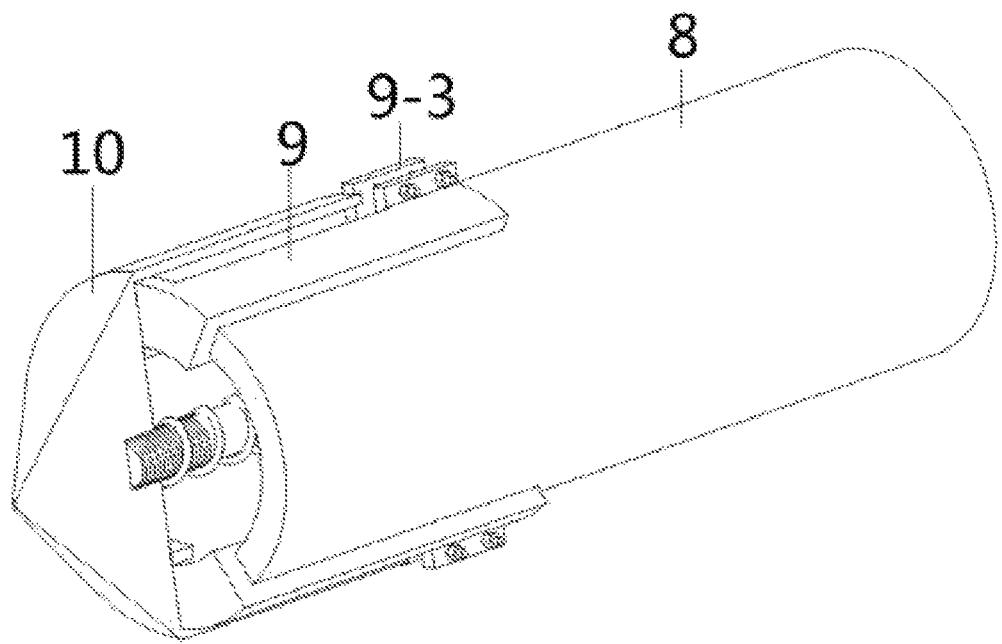
FIG. 15 is a structural diagram when a self-sealing pipe head and a grouting pipe are connected.
Figure 16:
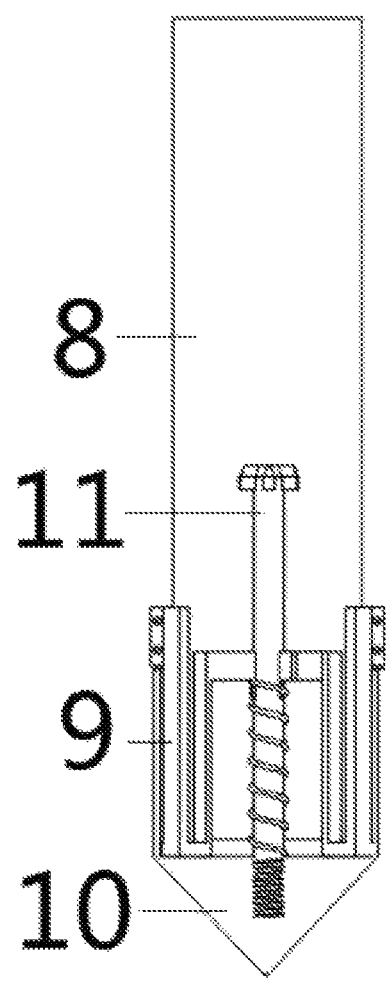
FIG. 16 is a sectional view of a self-sealing pipe head in a non-grouted state.
Figure 17:
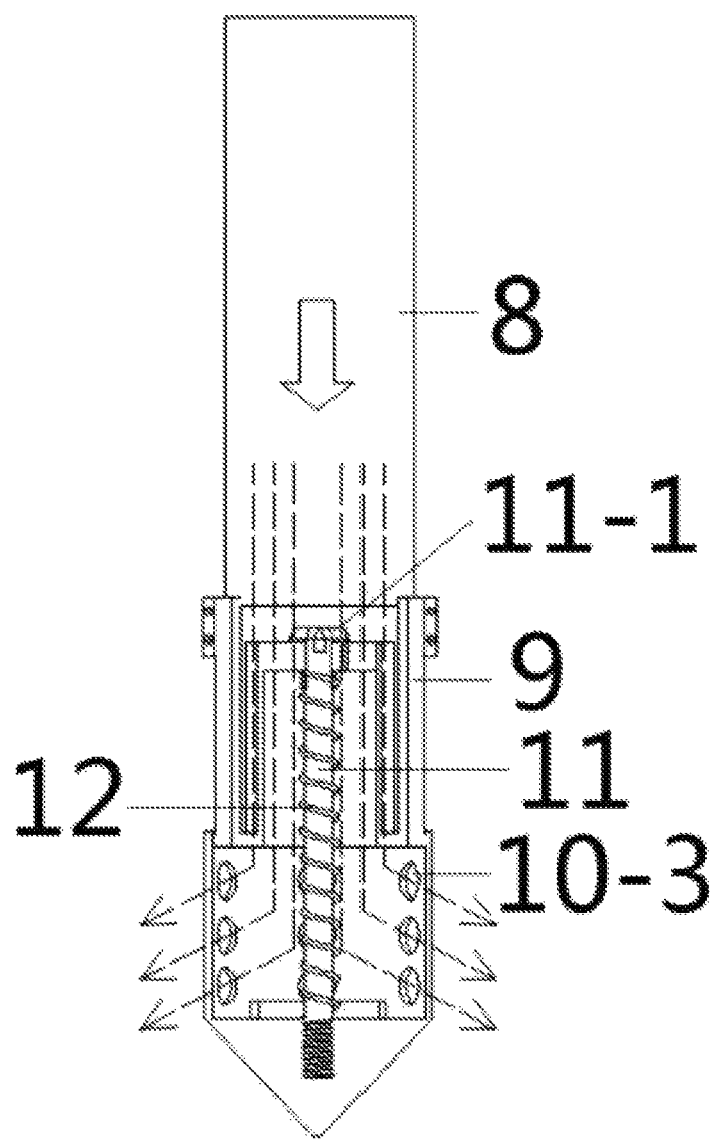
FIG. 17 is a sectional view of a self-sealing pipe head during grouting.

In the process of anchor cable assembly, the self-sealing pipe head is used at the bottom of the reserved grouting pipe. When the self-sealing pipe head is assembled, as shown in FIG. 14, firstly, one end of the connecting spring 12 is welded inside the end cap 10, then the grouting pipe socket 9 is arranged inside the end cap 10, and the other end of the connecting spring 12 is welded with the connecting spring base 9-7. The connecting limit rod 11 is passed through the reserved limit ring 9-4, and the screw thread 11-2 at one end of the connecting limit rod 11 is screwed into the end cap 10. In the initial state, one end of the grouting pipe socket 9 is in contact with an end of the tapered guide cap, and the self-sealing pipe head is in a closed state at this point. As shown in FIG. 15, according to the connection mode between the grouting pipe clamp 7 and the grouting pipe 8 described above, the grouting pipe 8 is sleeved into the grouting port installation groove 9-1, and a fastening bolt 9-3 is screwed to lock the pipe wall to prevent the self-sealing pipe head from falling out. During grouting, as shown in FIGS. 16 and 17, the slurry flows into the grouting pipe socket 9 and the end cap 10 along the slurry flow ports 9-5; and under the impact of the grouting pressure, the end cap 10 slides downward against the pulling force of the connecting spring 12, relative sliding occurs between the grouting pipe socket 9 and the end cap 10, the circular slurry outlets 10-3 on the end cap 10 are exposed, and the slurry leaks through the circular slurry outlet 10-3, so that the slurry is injected in a column shape and the grouting effect is improved. When the end cap 10 descends to a point where the limiting fin 11-1 at the top of the connecting limit rod 11 makes contact with the limiting groove 9-6 on the grouting pipe socket 9, the circular slurry outlets 10-3 are all exposed, and at the same time, the end cap 10 stops sliding downward under the limiting action of the limit fin 11-1. After the slurry stops flowing, the end cap 10 automatically resets under the elastic force of the connecting spring 12, and the self-sealing pipe head returns to the initial state.

The grouting process of the high-condensation grouting material using the grouting device is as follows: first, the assembly of the connector and the self-sealing pipe head is completed; then, a segment of grouting pipe 8 is connected with the grouting pipe clamp 7 so that the grouting pump is connected with the connecting section 2 through the segment of grouting pipe 8, another segment of grouting pipe 8 is connected with the grouting pipe socket 9, an anchor cable is released, and then the connecting section 2 is connected with the grouting pipe socket 9 through this segment of grouting pipe 8 to complete the installation of the whole grouting pipe; and after that, grouting is carried out, that is, the high-coagulability grouting material is pumped by the grouting pump into the connector through the grouting pipe 8, the flow and pressure of the slurry are measured in the connector, the slurry continues to flow into the grouting pipe socket 9 along with the grouting pipe 8, and under the impact of the grouting pressure, the end cap 10 slides downward against the pulling force of the connecting spring and leaks through the circular slurry outlets 10-3, so that the slurry is injected in a column shape and the grouting effect is improved. After grouting, the pipe is washed. If the construction interval is long, the grouting pipe shall be split, cleaned, sealed and stored for future grouting construction.

The grouting device for high-coagulability grouting materials provided by the invention has been introduced in detail. In this article, specific examples are used to explain the principle and implementation of the invention, and the description of the above embodiments is only used to help understand the method of the invention and its core ideas. It should be pointed out that for those of ordinary skill in the art, multiple improvements and modifications may be made to the invention without departing from the principle of the invention, and these improvements and modifications also fall within the scope of protection of the claims of the invention. The above description of the disclosed embodiments enables those skilled in the art to implement or use the invention. Various modifications to these embodiments will be apparent to those skilled in the art, and the general principles defined herein may be implemented in other embodiments without departing from the spirit or scope of the invention. Therefore, the invention should not be limited to the embodiments shown herein, but should accord with the widest scope consistent with the principles and novel features disclosed herein.

What is claimed is:

1. A grouting device for high-coagulability grouting materials, comprising a grouting pipe, a connector and a self-sealing pipe head, wherein one end of the connector is connected with a grouting pump through the grouting pipe, the other end of the connector is connected with the self-sealing pipe head through the grouting pipe, and the grouting pipe is connected with the connector and the self-sealing pipe head in a fixed and sealed mode;

the connector comprises a measuring section, a connecting section, a hold-down bolt and a grouting pipe clamp, wherein the measuring section is fixedly located in a middle of the connecting section, and left and right sides of the measuring section are both fixedly connected with the connecting section; both the measuring section and the connecting section are provided with inner holes, and the inner holes communicate; a stepped hole is formed in the connecting section and comprises a large hole and a small hole, wherein a hole facing the measuring section is the small hole with a same diameter as the inner hole of the measuring section, and a hole facing a free end of the connecting section is the large hole; the grouting pipe clamp reciprocates in the large hole in its axial direction; two axial transverse sliding grooves I are symmetrically formed in a pipe wall of the connecting section with the large hole, and the transverse sliding grooves I run through the axial direction of the large hole; one end of an inner wall of the large hole facing the free end of the connecting section is provided with a pressing internal thread, and the pressing internal thread is matched with an external thread of the hold-down bolt; an end of the inner wall of the large hole facing the small hole is provided with a butting section, and the butting section is in contact with the grouting pipe clamp; and the butting section is provided with a circumferential sliding groove;

the hold-down bolt and the grouting pipe clamp are arranged in the large hole of the connecting section from outside to inside in sequence, the hold-down bolt comprises a bolt head and a screw fixedly connected with the bolt head, the screw and the bolt head are provided with central holes which communicate with each other, and the grouting pipe clamp is arranged in the central hole of the hold-down bolt; an outer surface of the screw is provided with a pressing external thread, and the pressing external thread is matched with the pressing internal thread in the connecting section; two sliding slits are symmetrically arranged on the screw in its axial direction, and the sliding slits correspond to and vertically communicate with the transverse sliding grooves I; and two transverse sliding grooves II are symmetrically formed in the bolt head correspondingly, and the transverse sliding grooves II are connected with the sliding slits;

the grouting pipe clamp comprises an outer wall and an inner pipe, wherein the outer wall is cylindrical and configured to slide in the central hole of the hold-down bolt in its axial direction, the inner pipe is arranged in the outer wall, and a diameter of the inner pipe is same as a diameter of the small hole; the inner pipe is fixedly connected with the outer wall, and a radial gap is formed between the inner pipe and the outer wall; a pipe wall of the grouting pipe is arranged between the outer wall and the inner pipe; two limit-sliding protrusions are symmetrically arranged on a side of the outer wall facing the small hole, the limit-sliding protrusions are respectively arranged in the transverse sliding groove II and the transverse sliding groove I, and the limit-sliding protrusions slide back and forth in the transverse sliding groove II and the transverse sliding groove I; the limit-sliding protrusions rotate along the circumferential sliding groove; a side of the outer wall facing the free end of the connecting section is provided with several pressing protrusions, and the pressing protrusions are in contact with an end of the hold-down bolt; a locking band is fixed to an end of the outer wall, and two ends of the locking band are connected by a locking bolt;

the self-sealing pipe head comprises a grouting pipe socket, an end cap, a connecting limit rod and a connecting spring; wherein the grouting pipe socket is connected with the connector through the grouting pipe, the grouting pipe is fixedly sleeved at one end of the grouting pipe socket, and the other end of the grouting pipe socket is sleeved in the end cap; the grouting pipe socket slides in the end cap, and the grouting pipe socket is connected with the end cap through the connecting spring; one end of the connecting limit rod passes through the grouting pipe socket and is screwed into the end cap, the connecting limit rod is fixedly connected with the end cap, and the other end of the connecting limit rod is provided with a limit mechanism; and an outer surface of the grouting pipe socket is provided with several deformation grooves, and the deformation grooves are provided with fastening bolts.

2. The grouting device for the high-coagulability grouting materials according to claim 1, wherein the measuring section is provided with a flow meter and a pressure sensor, and the flow meter and the pressure sensor are connected with the measuring section through sensor joints respectively.

3. The grouting device for the high-coagulability grouting materials according to claim 1, wherein an outer diameter of the inner pipe is larger than an inner diameter of the grouting pipe, an extrusion sponge is fixed at an end of the outer wall-facing the small hole, and a locking band is correspondingly fixed at the other end of the outer wall.

4. The grouting device for the high-coagulability grouting materials according to claim 1, wherein the grouting pipe socket comprises an outer socket wall and an inner socket wall, wherein the inner socket wall is arranged on an inner side of the outer socket wall, and a bottom of the inner socket wall is fixedly connected with the outer socket wall; a radial gap is formed between the inner socket wall and the outer socket wall, thus forming a grouting port installation groove, one end of the grouting port installation groove is open and the other end is closed; the pipe wall of the grouting pipe is inserted into the grouting port installation groove from the open end; an outer diameter of the inner socket wall is larger than an inner diameter of the grouting pipe; a reserved limit ring is arranged at a center of the grouting pipe socket, the reserved limit ring is connected with an inner surface of the inner socket wall through several connecting rods arranged at intervals, and the connecting rods divide a gap between the reserved limit ring and the inner socket wall into several slurry flow ports; the connecting limit rod passes through a central hole of the reserved limit ring, and a side of the reserved limit ring-facing the grouting pipe is provided with a limit groove; a side face of the reserved limit ring facing the end cap is provided with a connecting spring base, one end of the connecting spring is fixedly connected with the connecting spring base by welding, and the other end of the connecting spring is fixedly connected with the end cap.

5. The grouting device for the high-coagulability grouting materials according to claim 1, wherein the end cap comprises a tapered guide cap and a hollow pipe, wherein the tapered guide cap is fixed at a bottom of the hollow pipe, the grouting pipe socket is arranged in the hollow pipe, and the grouting pipe socket slides axially in the hollow pipe; an end of the tapered guide cap is provided with a screw hole, and correspondingly, an end of the connecting limit rod is provided with an external thread; a plug is fixed at the end of the tapered guide cap, and an outer diameter of the plug is the same as an inner diameter of the inner wall of the grouting pipe socket; and a pipe wall of the hollow pipe is provided with several circular slurry outlets.

6. The grouting device for the high-coagulability grouting materials according to claim 1, wherein one end of the connecting limit rod is provided with a tightening thread, the tightening thread is fixedly connected with a screw hole in the end cap through a thread, and the other end of the connecting limit rod is provided with a limit fin; and the limit fin corresponds to a limit groove on a reserved limit ring, and the connecting spring is sleeved outside the connecting limit rod.

7. The grouting device for the high-coagulability grouting materials according to claim 1, wherein an opening angle of the circumferential sliding groove is 90°, occupying ¼ of a circular section, and a rotation direction of the circumferential sliding groove is opposite to a rotation direction of the pressing internal thread.

* * * * *